April 11, 1933.  C. H. RICHARDS  1,903,596
CONVERTIBLE SLED AND WHEELED COASTER
Original Filed April 29, 1931  2 Sheets-Sheet 2
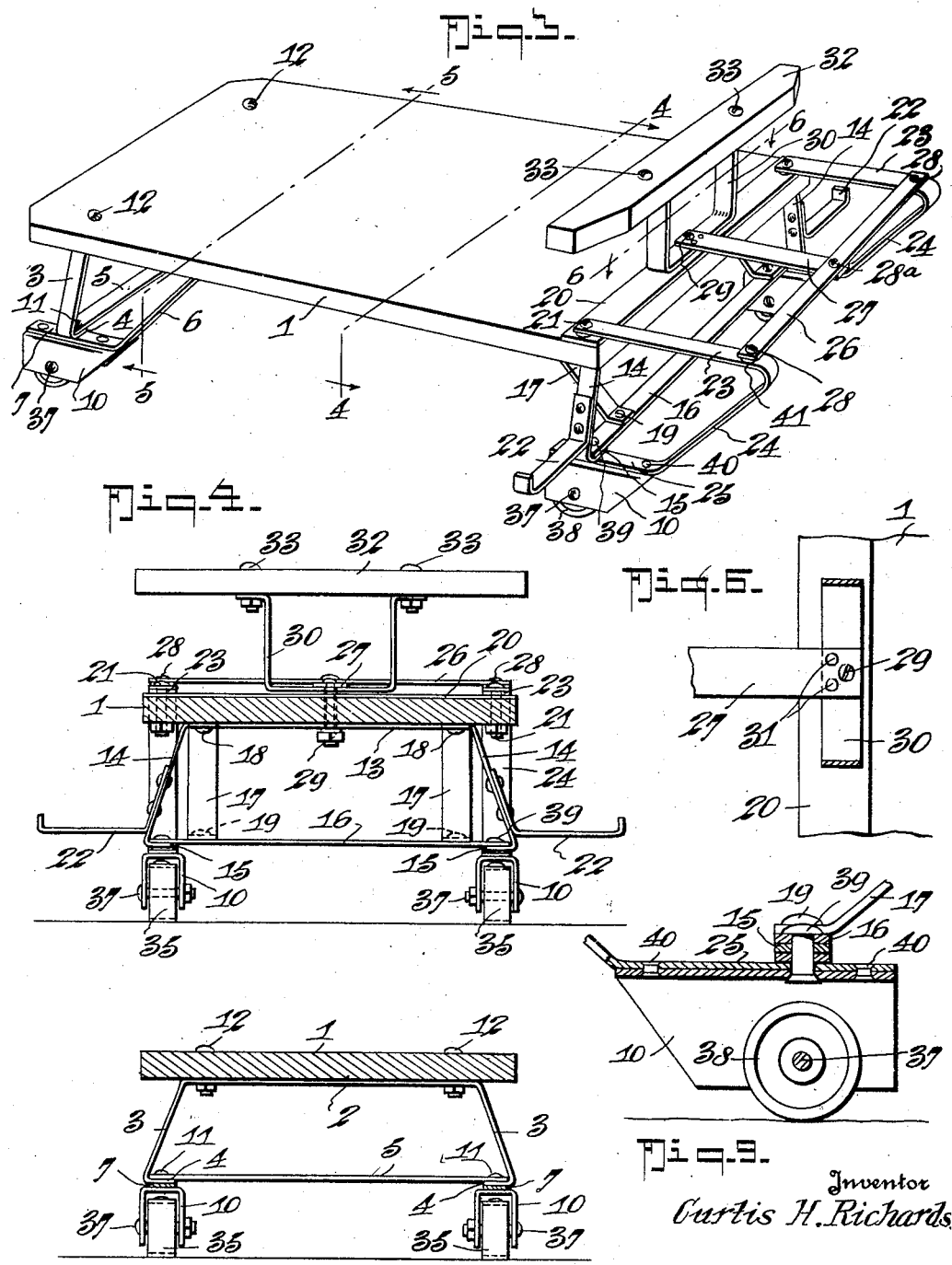

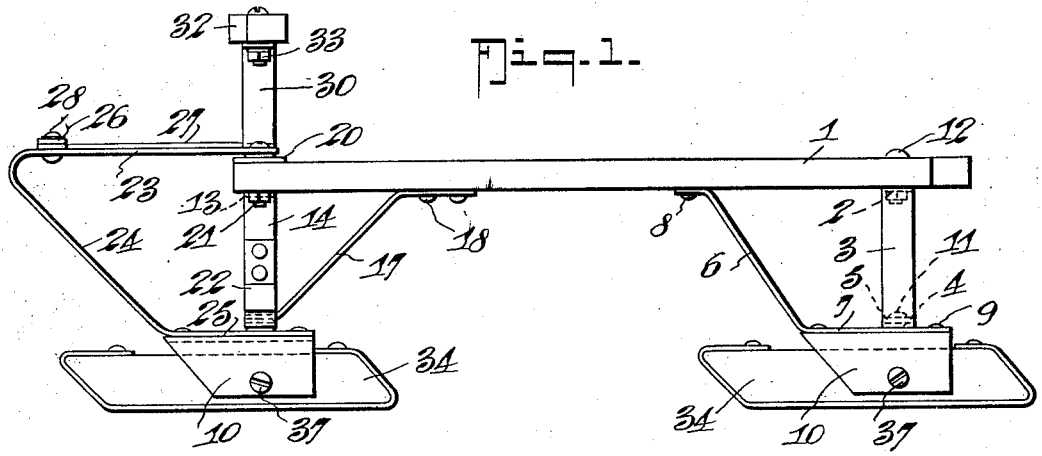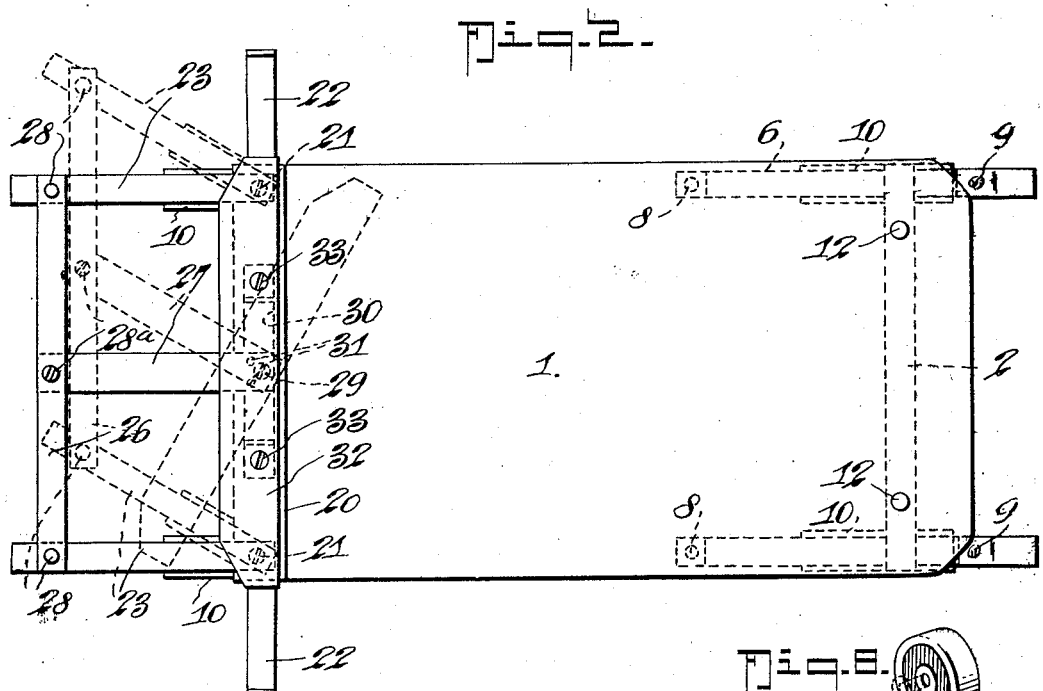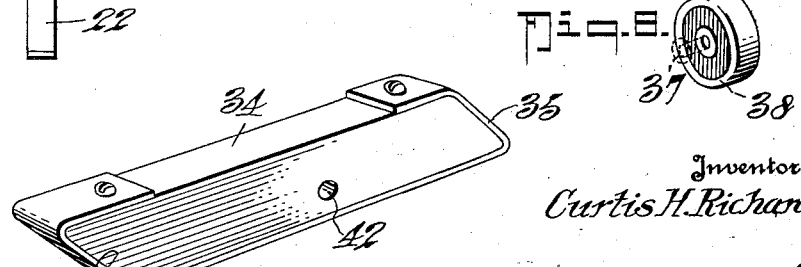

Patented Apr. 11, 1933

1,903,596

UNITED STATES PATENT OFFICE

CURTIS H. RICHARDS, OF SAN FRANCISCO, CALIFORNIA

CONVERTIBLE SLED AND WHEELED COASTER

Application filed April 29, 1931, Serial No. 533,819. Renewed September 22, 1932.

My invention relates to the art of vehicles and particularly to those used by children either as sleds in snow or as wheeled coasters in fair weather, and it particularly has for its object to provide a simple, ruggedly constructed, inexpensive, convertible sled and wheeled coaster which will readily and effectively serve its intended purposes.

Further, it is an object to provide such a vehicle in which only one bolt for each runner need be removed in order to change over from a sled to a wheeled coaster or vice versa.

Further, it is an object to provide a vehicle of the character stated having four runners (either sled runners or wheel runners) so that the vehicle may maintain its platform level and not turn over on its side as is the case where a two-wheel-tandem structure is employed as for example that disclosed in the patent to McNeil, No. 1,477,513, of December 11, 1923.

Further, it is an object of the invention to combine with the front runner carriers a simple and convenient steering mechanism which will also function as a bumper or fender and guard to protect the front runners against collision shocks which would likely injure them, the construction being such that a part of the combined steering mechanism and fender in advance of each forward runner carrier will serve as an inclined supplemental runner so that the vehicle will ride up over obstructions of ordinary height without damage to the runners, the construction also being such that should the vehicle run into a tree or stump the runners will be protected against contact with the same.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:

Figure 1 is a side elevation of my invention arranged as a sled.

Figure 2 is a plan view of the same.

Figure 3 is a perspective view of my invention arranged as a wheeled coaster.

Figure 4 is a cross section on the line 4—4 of Figure 3.

Figure 5 is a cross section on the line 5—5 of Figure 3.

Figure 6 is a detail horizontal section on the line 6—6 of Figure 3.

Figure 7 is a detail perspective view of one of the sled runners.

Figure 8 is a detail perspective view of one of the wheel runners.

Figure 9 is a detail sectional view taken longitudinally through one of the front runner carriers.

In the drawings, in which like numerals of reference indicate like parts in all of the figures, 1 represents the body board or platform beneath which the rear and front standards are secured.

The rear standard comprises a cross cleat flat bar 2 having downwardly diverging legs 3 at its sides that terminate in inwardly bent feet 4 which are connected by a lower cross bar brace 5.

Forwardly extended diagonal braces 6 are provided which are secured at 8 to the platform and have rearwardly directed feet 7 which are fastened at 9 to the inverted U-shaped runner carriers or stirrups 10. The parts 10, 7, 4 and 5 are securely riveted together at 11, while the cross cleat bar 2 is secured to the platform 1 by bolts 12.

The front standard is substantially of the same construction as the rear standard and includes the front cross cleat bar 13 having downwardly diverging legs 14 terminating in inwardly bent feet 15 that are connected together by a lower cross bar 16, there being rearwardly extended diagonal braces 17 secured at 18 to the platform 1 and at 19 to the cross brace bar 16.

Across the top of the platform is placed a cleat in the nature of a flat metal bar 20 which is secured to the platform by end bolts 21 that also serve to secure the forwardly extending horizontal bar portions 23 of the combined steering mechanism and fender.

Suitable foot rests 22 are secured to and project laterally from the legs 14.

The combined steering mechanism and bumper or fender comprise the forwardly extending horizontal bar portions 23 from which the downwardly and rearwardly extended bar portions continue, the latter terminating in rearwardly extending horizontal feet 25.

The forwardly extending horizontal bar portions 23 are connected by a front cross bar 26 which not only serves as a connecting rod between these parts but also as a bumper bar, there being an intermediate bar 27 pivoted at 29 and pivotally secured at 28a to the bar 26, the latter being similarly pivotally secured at 28 to the bar portions 23.

30 is a U-shaped handle carrier which is riveted at 31 rigidly to the bar 27 and which is secured at 33 to the handle 32.

34 designates the sled runner blocks which, in the construction shown, are composed of wood or other suitable material in elongated form having a flat under surface and inclined front ends 36, the under surface and the front and rear ends being sheathed by a suitable metal band or strap 35 to take up wear.

The runners have pivot apertures 42 to receive the axle bolts 37 which pass through suitable apertures in the inverted U-shaped runner carriers or stirrups 10.

38 are wheels which take the place of the runners 34 when the vehicle is to be used as a wheeled coaster. Suitable bolts 39 serve to secure the parts 16 and 15 together and pivotally to secure the parts 10 and 25 to the front standard, the parts 25 being also securely riveted at 40 to the members 10.

Washers 41 are interposed where necessary to allow for wear and to give sufficient freedom of pivotal movement between the parts.

It will be observed that when the wheels are used as in Figure 3 they are fully protected against being struck by engaging obstructions due to the bevelled front portion of the runner carriers 10 and to the corresponding bevelled or inclined parts 24. The vehicle, as shown in Figure 3, will ride up over car tracks, curbs and other similar obstructions without damaging the runner wheels.

It will also be noted from Figure 1 that when the sled runners are used protection against damaging the runners by engaging stumps, trees or other similar obstructions, is obtained by virtue of the members 24 overhanging the runners 34 and extending a greater distance forwardly than the front ends of said runners.

The steering mechanism is so designed that it performs not only the function of a steering mechanism but the function of a fender or bumper to protect the vehicle from ordinary obstructions.

In order to change over from the arrangement shown in Figure 1 to that shown in Figure 3 it is only necessary to remove the four bolts 37 and replace the runners 34 by the wheels 38 and restore the bolts 37 to their proper places. A reverse change may be made just as quickly and conveniently.

The vehicle is a four wheel or a four sled runner structure and therefore will not readily turn over on its side when not supported by an external medium. It thus becomes a safe vehicle for the use of small children as well as children of more mature years.

From the foregoing description, taken in connection with the accompanying drawings, it is thought the complete construction, operation and advantages of my invention will be clear to those skilled in the art to which it relates.

What I claim is:

1. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrup, runners pivotally held in said stirrup on said axle bolts, means rigidly securing the rear pair of stirrups to the rear framework, means pivotally securing the forward pair of stirrups to the front framework, and a suitable steering mechanism secured to said platform and to said forward pair of stirrups.

2. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrup, runners pivotally held in said stirrup on said axle bolts, means rigidly securing the rear pair of stirrups to the rear framework, means pivotally securing the forward pair of stirrups to the front framework, a forwardly extending horizontal bar pivotally secured to said platform at each side thereof and each of said bars having a downwardly and rearwardly extended portion terminating in a rearwardly extended foot, means securing said rearwardly extended feet rigidly to the forward pair of stirrups, a connecting bar pivoted to said forwardly extending horizontal bars, an intermediate bar pivoted to said connecting bar and to said platform, and a handle with a standard rigidly secured to said intermediate bar for steering purposes.

3. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrups, runners pivotally held in said stirrups on said axle bolts, means rigidly securing the rear pair of stirrups to the rear framework, means pivotally securing the forward pair of stirrups to the front framework, a suitable steering mechanism secured to said platform and to said forward pair of stirrups, and foot rests secured to and projecting laterally from the downwardly extended legs of the front standard.

4. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrups, runners pivotally held in said stirrups on said axle bolts, means rigidly securing the rear pair of stirrups to the rear framework, means pivotally securing the forward pair of stirrups to the front framework, a forwardly extending horizontal bar pivotally secured to said platform at each side thereof and each of said bars having a downwardly and rearwardly extended portion terminating in a rearwardly extended foot, means securing said rearwardly extended feet rigidly to the forward pair of stirrups, a connecting bar pivoted to said forwardly extending horizontal bars, an intermediate bar pivoted to said connecting bar and to said platform, a handle with standard rigidly secured to said intermediate bar for steering purposes, and foot rests secured to and projecting laterally from the downwardly extended legs of the front standard.

5. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrups, runners pivotally held in said stirrups on said axle bolts, means rigidly securing the rear pair of stirrups to the rear framework, means pivotally securing the forward pair of stirrups to the front framework, and a suitable steering mechanism secured to said platform and to said forward pair of stirrups, said runners comprising elongated bars having their front ends bevelled and being sheathed on their under face and ends by metallic strips.

6. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrups, runners pivotally held in said stirrups on said axle bolts, means rigidly securing the rear pair of stirrups to the rear framework, means pivotally securing the forward pair of stirrups to the front framework, a forwardly extending horizontal bar pivotally secured to said platform at each side thereof and each of said bars having a downwardly and rearwardly extended portion terminating in a rearwardly extended foot, means securing said rearwardly extended feet rigidly to the forward pair of stirrups, a connecting bar pivoted to said forwardly extending horizontal bars, an intermediate bar pivoted to said connecting bar and to said platform, and a handle with a standard rigidly secured to said intermediate bar for steering purposes, said runners comprising elongated bars having their front ends bevelled and being sheathed on their underfaces and ends by metallic strips.

7. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrups, runners pivotally held in said stirrups on said axle bolts, means rigidly securing the rear pair of stirrups to the rear framework, means pivotally securing the forward pair of stirrups to the front framework, a suitable steering mechanism secured to said platform and to said forward pair of stirrups, and foot rests secured to and projecting laterally from the downwardly extended legs of the front standard, said runners comprising elongated bars having their front ends bevelled and being sheathed on their under face and ends by metallic strips.

8. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrups, runners pivotaly held in said stirrups on said axle bolts, means rigidly securing the rear pair of stirrups to the rear framework, means pivotally securing the forward pair of stirrups to the front framework, a forwardly extending horizontal bar pivotally secured to said platform at each side thereof and each of said bars having a downwardly and rearwardly extended portion terminating in a rearwardly extended foot, means securing said rearwardly extended feet rigidly to the forward pair of stirrups, a connecting bar pivoted to said forwardly extending horizontal bars, an intermediate bar pivoted to said connecting bar and to said platform, a handle with standard rigidly secured to said intermediate bar for steering purposes, and foot rests secured to and projecting laterally from the downwardly extended legs of the front standard, said runners comprising elongated bars having their front ends bevelled and being sheathed on their under face and ends by metallic strips.

9. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrups, runners pivotally held in said stirrups on said axle bolts, means rigidly securing the rear pair of stirrups to the rear framework, means pivotally securing the forward pair of stirrups to the front framework, and a suitable steering mechanism secured to said platform and to said forward pair of stirrups, said runners comprising wheels.

10. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrups, runners pivotally held in said stirrups on said axle bolts, means rigidly securing the rear pair of stirrups to the rear framework, means pivotally securing the forward pair of stirrups to the front framework, a forwardly extending horizontal bar pivotally secured to said platform at each side thereof and each of said bars having a downwardly and rearwardly extended portion terminating in a rearwardly extended foot, means securing said rearwardly extended feet rigidly to the forward pair of stirrups, a connecting bar pivoted to said forwardly extending horizontal bars, an intermediate bar pivoted to said connecting bar and to said platform, and a handle with a standard rigidly secured to said intermediate bar for steering purposes, said runners comprising wheels.

11. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrups, runners pivotally held in said stirrups on said axle bolts, means rigidly securing the rear pair of stirrups to the rear framework, means pivotally securing the forward pair of stirrups to the front framework, and a suitable steering mechanism secured to said platform and to said forward pair of stirrups, said runners each comprising an elongated body having a flat under face, and a bevelled front end face and of greater length than the length of the stirrups in which it is mounted, said runners being so located in their respective stirrups that they will have a limited pivotal movement on their axle bolts, the movement being limited by engagement between the front and back top edges of the stirrups with the top face of the runners.

12. In a convertible sled and wheeled coaster, a platform, a front standard and a rear standard secured to and beneath the platform, each standard comprising a transverse cross cleat bar having downwardly extended legs terminating in inwardly extended feet, a lower cross bar brace connecting said feet, diagonal brace bars connected to said platform and to said cross bar brace, an inverted U-shaped stirrup at each side of said frame which constitutes runner carriers, axle bolts carried by said stirrups, runners pivotally held in said stirrups on said axle bolts, means rigidly securing the rear pair of stirrups to the rear framework, means pivotally securing the forward pair of stirrups to the front framework, and a suitable steering mechanism secured to said platform and to said forward pair of stirrups, said runners each comprising an elongated body having a flat under face, and a bevelled front end face of wood shod with strap iron and of greater length than the length of the stirrups in which it is mounted, said runners being so located in their respective stirrups that they will have a limited pivotal movement on their axle bolts, the movement being limited by engagement between the front and back top edges of the stirrups with the top face of the runners.

13. In a convertible sled and wheeled coaster, a platform, a front standard and a rear standard secured to and beneath the platform, an inverted U-shaped stirrup at each side of each standard which constitutes runner carriers, axle bolts carried by said stirrups, runners pivotally held in said stirrups on said axle bolts, means rigidly securing the rear pair of stirrups to the rear standard, means pivotally securing the forward pair of stirrups to the front standard, a forwardly extending horizontally bar pivotally secured to said platform at each side thereof and each of said bars having a downwardly and rearwardly extended portion terminating in a rearwardly extended foot, means securing said rearwardly extended feet rigidly to the forward pair of stirrups, a connecting bar pivoted to said forwardly extending horizontal bars, an intermediate bar pivoted to said connecting bar and to said platform, and a handle with a standard rigidly secured to said intermediate bar for steering purposes, said runners comprising elongated bars having their front ends bevelled and being sheathed on their underfaces and ends by metallic strips.

14. In a convertible sled and wheeled coaster, a platform, a front standard and a rear standard secured to and beneath the platform, an inverted U-shaped stirrup at each side of said standard which constitutes runner carriers, axle bolts carried by said stirrups, runners pivotally held in said stirrups on said axle bolts, means rigidly securing the rear pair of stirrups to the rear framework, means pivotally securing the forward pair of stirrups to the front framework, and a suitable steering mechanism secured to said platform and to said forward pair of stirrups, said runners each comprising an elongated body having a flat under face, and a bevelled front end face of wood shod with strap iron and of greater length than the length of the stirrups in which it is mounted, said runners being so located in their respective stirrups that they will have a limited pivotal movement on their axle bolts, the movement being limited by engagement between the front and back top edges of the stirrups with the top face of the runners.

CURTIS H. RICHARDS.